(12) United States Patent
Babinet et al.

(10) Patent No.: US 11,850,537 B2
(45) Date of Patent: Dec. 26, 2023

(54) DEVICE FOR INSERTING A PACKING SECTION

(71) Applicant: L'Air Liquide, Societe Anonyme pour l'Etude et l'Exploitation des Procedes Georges Claude, Paris (FR)

(72) Inventors: Cyrille Babinet, Vitry sur Seine (FR); Eric Gallopin, Jouy-en-Josas (FR); Gilles Lebain, Vitry sur Seine (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 18/106,994

(22) Filed: Feb. 7, 2023

(65) Prior Publication Data
US 2023/0249097 A1 Aug. 10, 2023

(30) Foreign Application Priority Data
Feb. 8, 2022 (FR) .................. FR 2201091

(51) Int. Cl.
*B01D 3/32* (2006.01)
*B01J 19/24* (2006.01)

(52) U.S. Cl.
CPC ............... *B01D 3/32* (2013.01); *B01J 19/24* (2013.01); *B01J 19/249* (2013.01);
(Continued)

(58) Field of Classification Search
CPC . B01D 3/32; B01J 19/24; B01J 19/249; B01J 19/2485; B01J 2219/32296; B01J 2219/32275; B01J 2219/2472
See application file for complete search history.

(56) References Cited

U.S. PATENT DOCUMENTS

| 2,604,220 A * | 7/1952 | Frischmann | B66F 9/184 |
| | | | 294/902 |
| 2010/0063304 A1* | 3/2010 | Olbert | B01J 8/0035 |
| | | | 422/600 |

(Continued)

FOREIGN PATENT DOCUMENTS

| DE | 36 10 457 | 7/1987 |
| JP | S57 94340 | 6/1982 |

(Continued)

OTHER PUBLICATIONS

French Search Report for FR 2 201 091, Georges ClaudeSep. 16, 2022.

*Primary Examiner* — Bayan Salone
(74) *Attorney, Agent, or Firm* — Justin K. Murray

(57) ABSTRACT

The present invention relates to an insertion device for inserting at least one packing section for a gas/liquid separation column into a cylindrical casing, comprising a base provided with retaining means which are configured to grip a packing section and which are arranged uniformly around a main axis, characterized in that the insertion device comprises at least two fastening means secured to the base, said fastening means being configured to fasten the insertion device to the casing.
The invention also covers an insertion system for inserting at least one packing section into a cylindrical casing, comprising such an insertion device, and a method for inserting at least one packing section into a cylindrical casing that is implemented by such an insertion system.

12 Claims, 7 Drawing Sheets

(52) U.S. Cl.
CPC .... *B01J 19/2485* (2013.01); *B01J 2219/2472* (2013.01); *B01J 2219/32275* (2013.01); *B01J 2219/32296* (2013.01)

(56) References Cited

U.S. PATENT DOCUMENTS

2014/0126981 A1\* 5/2014 Le Sueur ................. B01J 19/24
  414/226.04
2021/0245099 A1\* 8/2021 Yoshida ............... B01J 19/2415

FOREIGN PATENT DOCUMENTS

| JP | H01 242 102 |   | 9/1989 |
|----|-------------|---|--------|
| JP | H01242102 A | \* | 9/1989 |
| JP | H11 333 283 |   | 12/1999 |
| JP | H11333283 A | \* | 12/1999 |
| JP | 2015 217 380 |   | 12/2015 |
| JP | 2015217380 A | \* | 12/2015 |

\* cited by examiner

[Fig. 1]
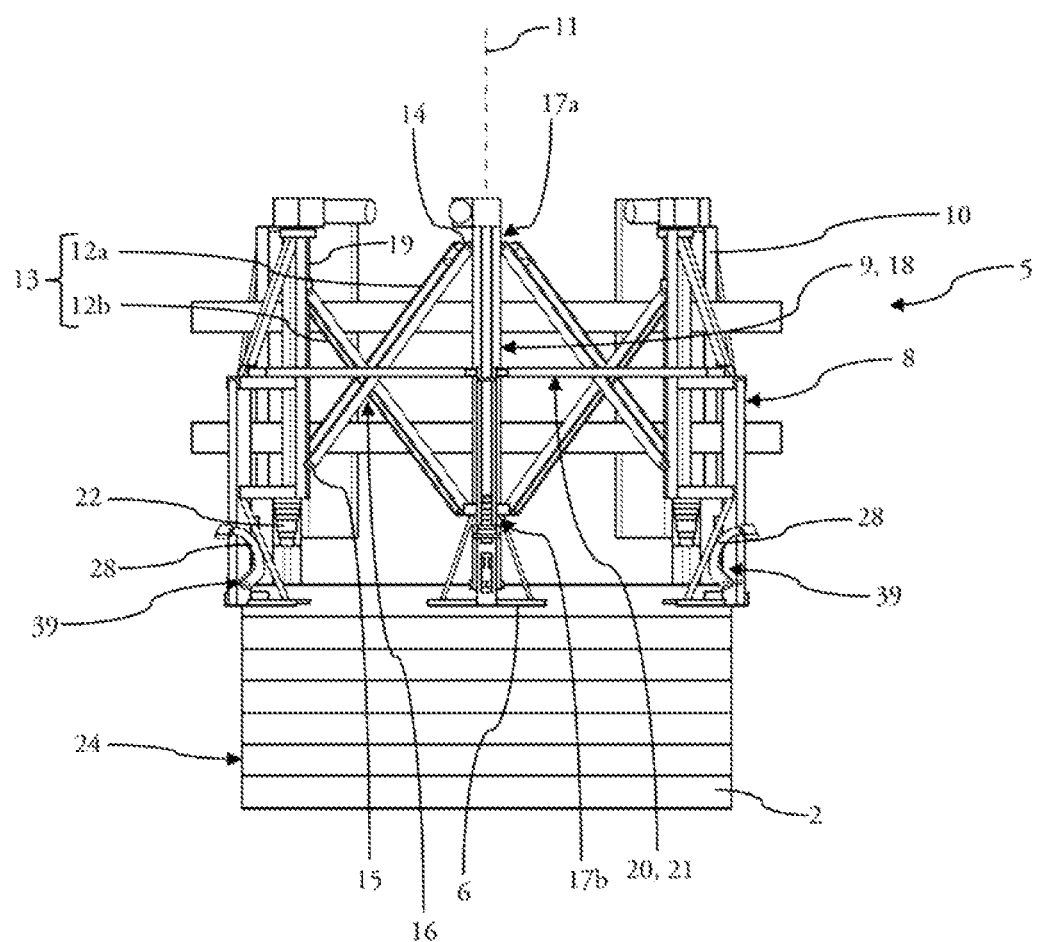

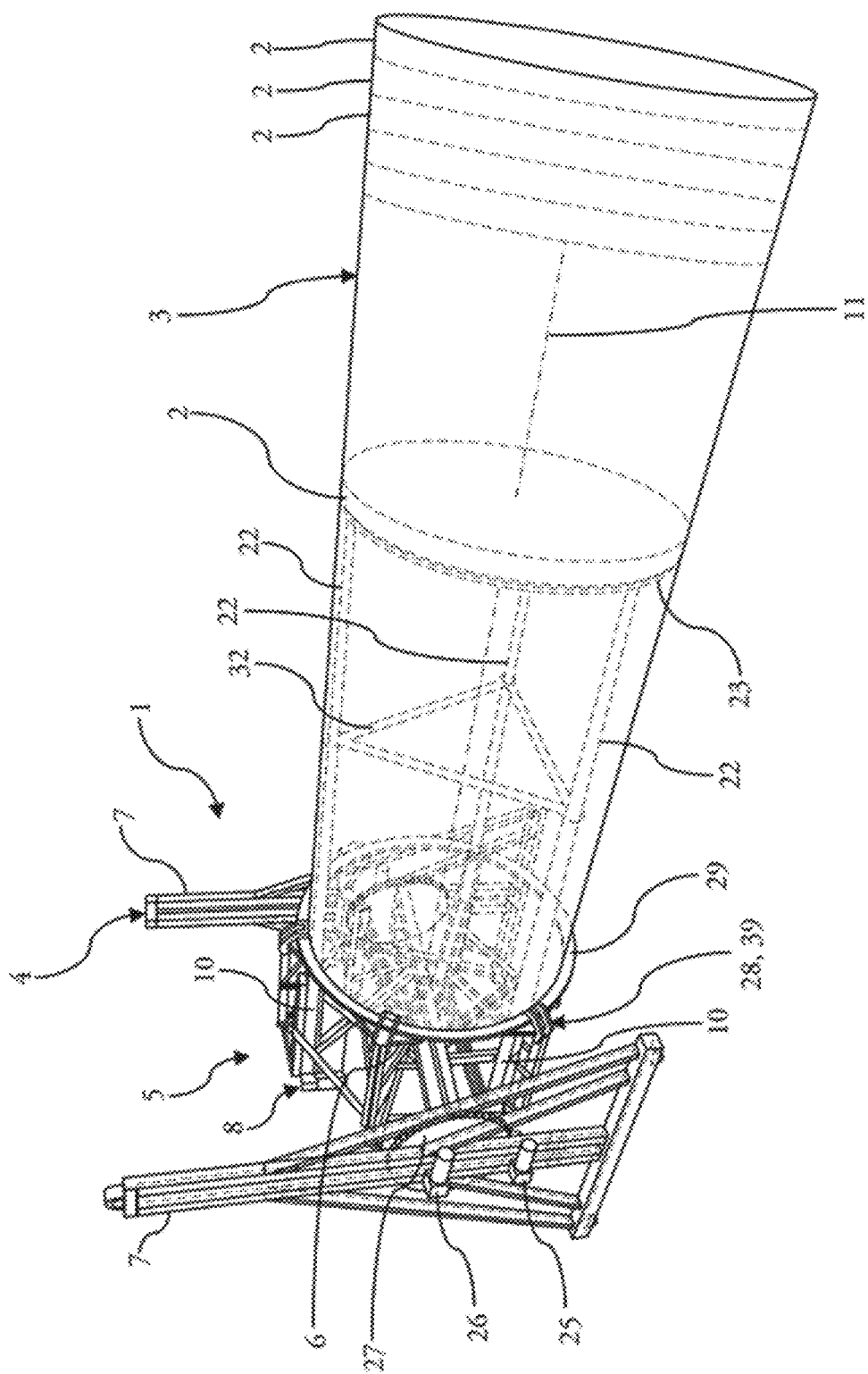
[Fig. 2]

[Fig. 3]
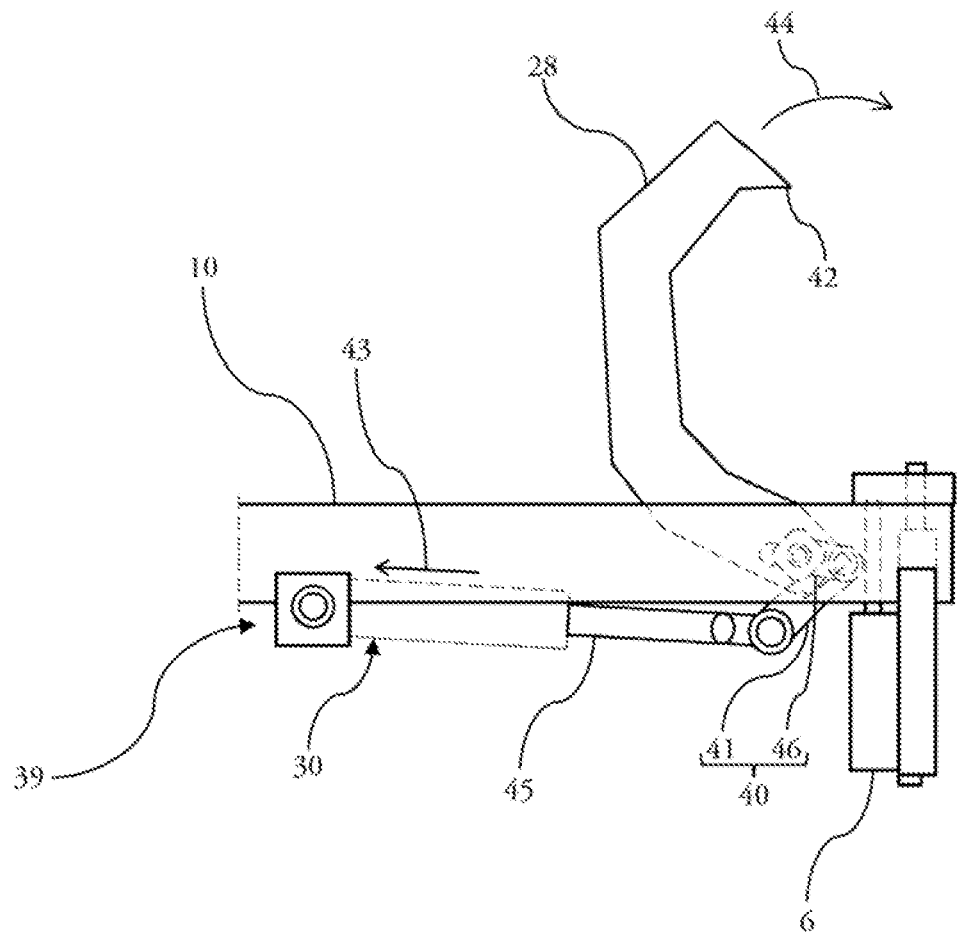

[Fig. 4]
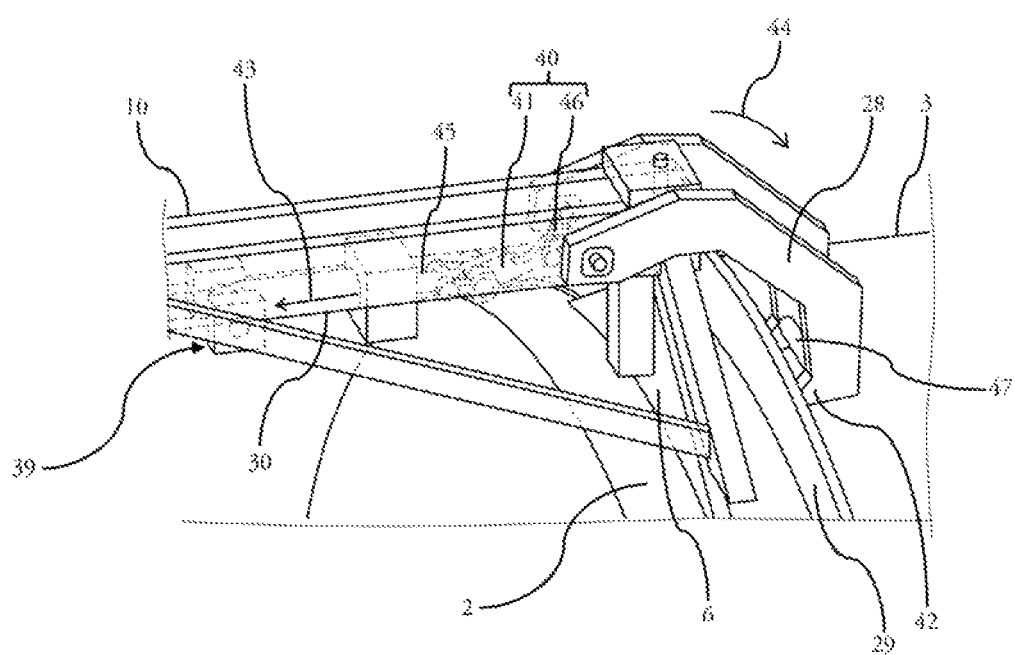

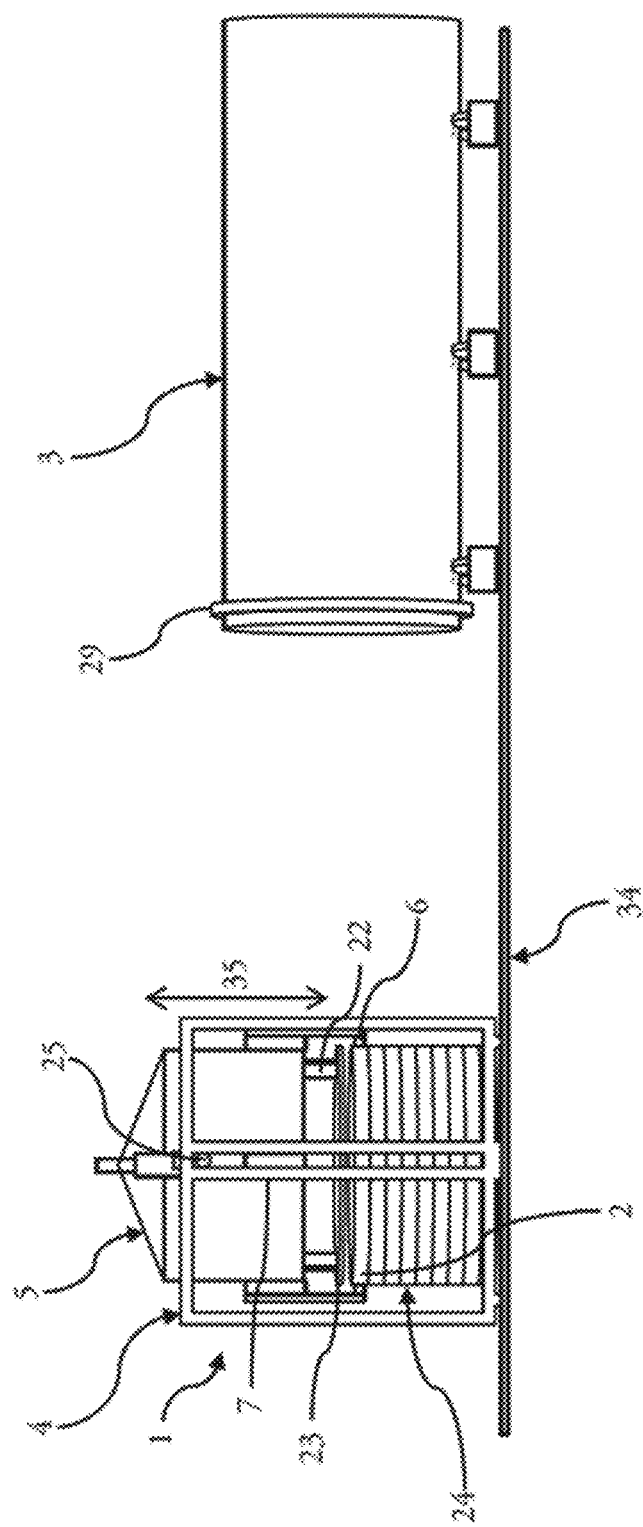

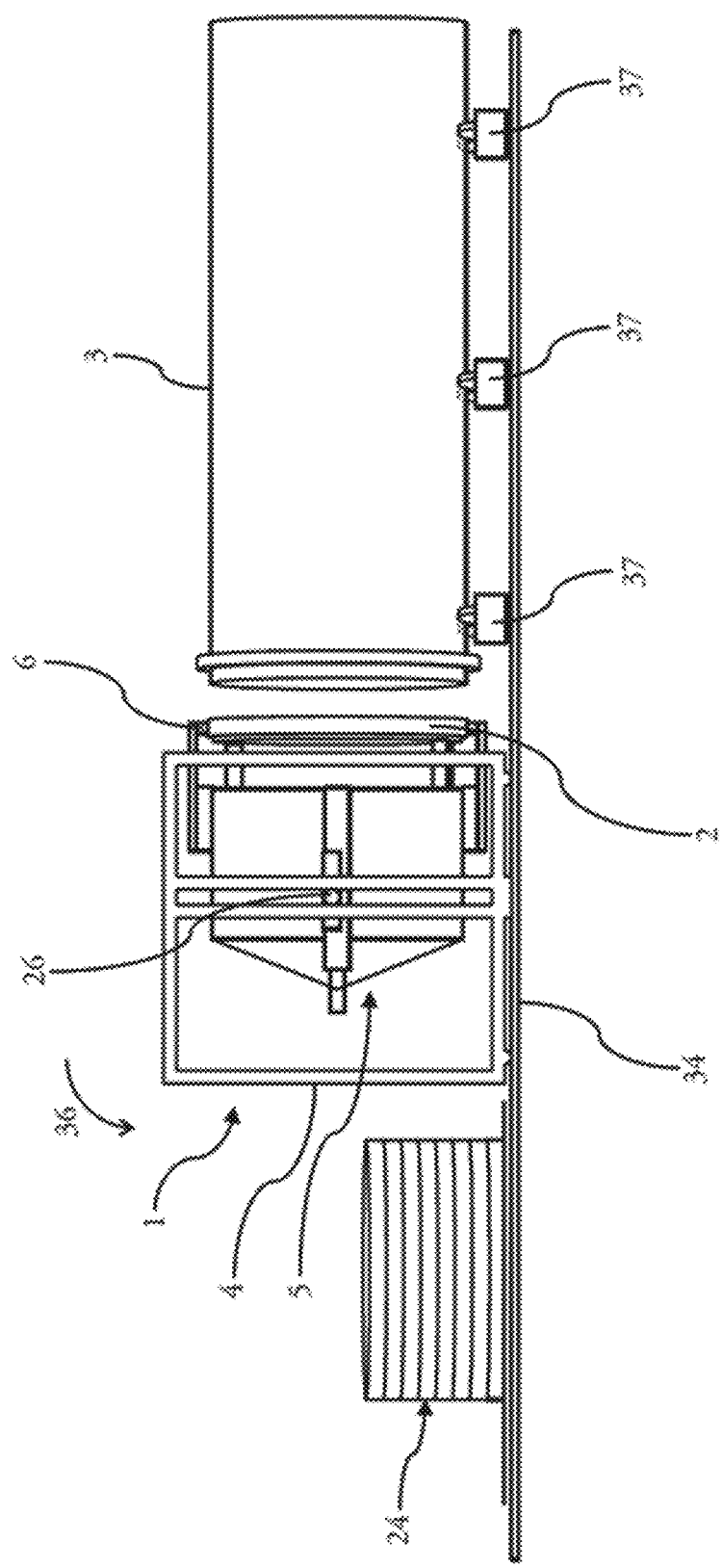
[FIG. 6]

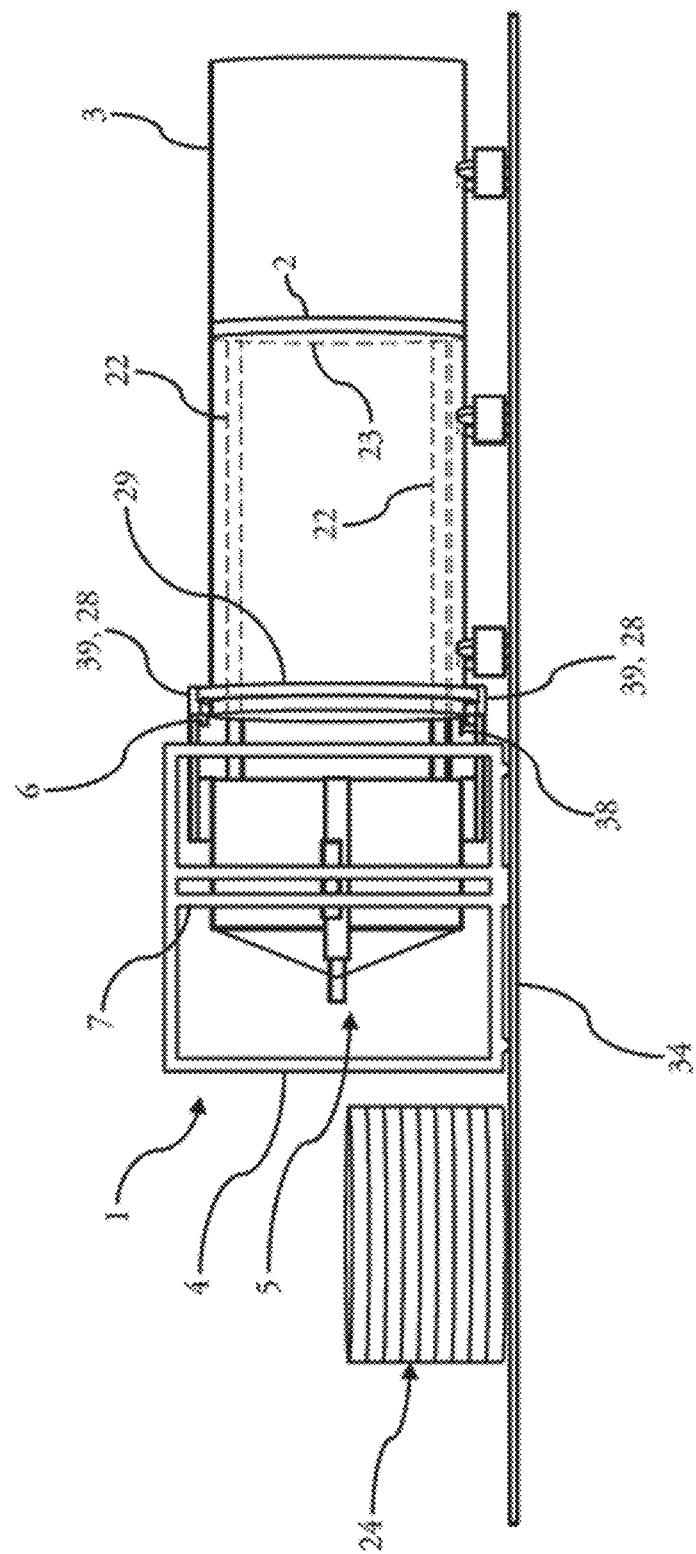
[FIG. 7]

DEVICE FOR INSERTING A PACKING SECTION

CROSS REFERENCE TO RELATED APPLICATIONS

This application claims the benefit of priority under 35 U.S.C. § 119 (a) and (b) to French patent application No. FR2201091, filed Feb. 8, 2022, the entire contents of which are incorporated herein by reference.

FIELD OF THE INVENTION

The present invention relates to the field of gas/liquid separation columns and to their assembly, and it more particularly concerns a device for inserting packing sections into a casing in order to form said gas/liquid separation columns.

BACKGROUND OF THE INVENTION

Gas/liquid separation columns have been known for many years and make it possible, for example, to carry out a separation of various chemical elements involved in the composition of a homogeneous fluid, for example by distillation or by absorption.

The manufacture of a gas/liquid separation column comprises in particular a step of inserting a plurality of packing sections for a gas/liquid separation column into a casing. The packing sections are particularly used in the columns to ensure the exchange of material and of heat between a rising gas and a descending liquid. These packing sections, which consist, in particular, of several superposed corrugated strips, are often referred to as "packs". The packing sections are conventionally stacked on each other, possibly with interposed separators, in order to help separate the components of the fluid along the axial dimension of the column.

JP H01 242102 describes a device for inserting at least one packing section into a cylindrical casing, comprising a base provided with retaining means which are configured to grip a packing section and which are arranged uniformly around a main axis.

It is known for packing sections to be inserted into a vertically held casing, the force of gravity greatly facilitating the progression of the packing section inserted into the casing. However, such a method can prove to be restrictive when the gas/liquid separation columns to be assembled have a large diameter and an axial dimension requiring the use of very long casings, of the order of several tens of metres. Specifically, such methods with vertical insertion of the packing sections then require equipment that is able to raise the packing sections over a large distance in order to place them facing the end of the casing, and also a production site having a ceiling height greater than the length of the casing.

It is therefore desired, for casings of great length, to provide an assembly method in which the insertion of the packing sections is carried out with the casing arranged horizontally. Such a position generates a number of constraints, in particular that of having to arrange a counterweight in contact with the end of the casing that is opposite to the end where the packing sections are inserted in order to retain the casing during the insertion. Since the insertion of the packing sections requires very intense pushing forces, the counterweight used must be sufficiently bulky to withstand such pushing forces.

SUMMARY OF THE INVENTION

Certain embodiments of the present invention make it possible to dispense with such a counterweight by proposing an insertion device for inserting at least one packing section into a cylindrical casing, comprising a base provided with retaining means which are configured to grip a packing section and which are arranged uniformly around a main axis, characterized in that the insertion device comprises at least two fastening means secured to the base, said fastening means being configured to fasten the insertion device to the casing.

By virtue of the fastening means, the insertion device is held against the casing, including during the insertion of the packing sections. The insertion of the packing sections can, for example, be carried out by telescopic devices which deploy in order to push the packing section. Such devices can have a high pushing force to the point of causing an unwanted movement of the casing. The fastening means overcome this eventuality by retaining the casing and by thus applying a force opposite to the force of the devices serving to insert the packing sections into the casing.

Certain embodiments of the insertion device allows a casing to be filled with a plurality of packing sections for a gas/liquid separation column in order to form a gas/liquid separation column. The base of the insertion device, more particularly the retaining means thereof, are able to grip a packing section by the sides thereof. The packing sections have a circular shape which can range up to 5 m in diameter, and therefore the base has to be dimensioned such that the retaining means can grip such a packing section by the sides. The main axis around which the retaining means are arranged can, for example, pass through the centre of the packing section and/or be parallel to or coincident with the axis of revolution of the casing. Once the packing section has been gripped, the latter is positioned at the inlet of the casing, and the insertion device can be held against the casing by way of the fastening means. With this being done, the packing section can be inserted into the casing without having a bulky counterweight against the opposite end of the casing to compensate for the pushing forces during the insertion.

According to one feature of certain embodiments of the invention, the fastening means are arranged uniformly around the main axis. The uniform distribution of the fastening means avoids unequal compensation of the pushing forces exerted on the packing section during the insertion thereof into the casing. A non-uniform distribution of the fastening means, or the presence of a single fastening means, risks creating a non-homogeneous retreat of the casing during the insertion of the packing section, particularly at one or more regions remote from the one or more fastening means, and therefore risks creating a misalignment between the casing and the packing sections which are to be inserted inside the casing.

According to one feature of certain embodiments of the invention, at least one fastening means and one retaining means are arranged on one and the same peripheral member of the base. The base can thus comprise a plurality of peripheral members, all arranged and distributed uniformly around the main axis. A peripheral member can thus bear a sole retaining means, a sole fastening means or else both at the same time, the essential thing being that the retaining means and the fastening means do not create any mechanical interference with one another that can harm the correct progress of the function of one and/or the other.

According to one feature of certain embodiments of the invention, the fastening means each comprise a retractable cylinder, a hook and a drive assembly mechanically connecting the retractable cylinder to the hook. The hook corresponds to the part of the fastening means that closes onto the casing in order to hold the insertion device facing the latter. The retractable cylinder makes it possible to control a position of the hook via the drive device. In this respect, the retractable cylinder can, for example, be a hydraulic or pneumatic cylinder.

According to one feature of certain embodiments of the invention, the drive assembly comprises at least one connecting rod and one crank which are configured to drive a pivoting movement of the hook according to a linear movement of the retractable cylinder. The retractable cylinder generates the linear movement by deploying or by retracting. This movement drives the drive assembly. With the connecting rod being set in movement, the latter then drives the crank, which in turn drives the movement of the hook. It is by virtue of the connecting rod and of the crank that the linear movement of the retractable cylinder is converted into a pivoting movement of the hook.

According to one feature of certain embodiments of the invention, the hooks are able to pivot between a retracted position and a deployed position. These two positions are dependent on the position of the retractable cylinder. By way of example, when the latter is fully deployed, the hook is in the retracted position, and when the retractable cylinder is fully retracted, the hook is in the deployed position. The retractable hook can, for example, be actuated remotely in order to deploy or retract the hook according to the requirement. A hook in the deployed position is in a position to be fastened to the casing and to hold the insertion device facing the latter. The deployed position is therefore implemented when positioning the insertion device to face the casing, once a packing section is facing the casing and ready to be inserted, and is maintained during the insertion of the packing section into the casing.

According to one feature of certain embodiments of the invention, the hooks in the retracted position are set back from the retaining means with respect to the main axis. The retracted position is implemented to avoid potential mechanical interference between the hooks in the deployed position and any other element of the insertion device. This retracted position is particularly useful when the insertion device is used to grip a packing section using the retaining means. The hooks are then pivoted to be set back from said retaining means with respect to the main axis, with the retracted hooks at a distance from the free end of the peripheral members in order that the hooks do not butt against a packing section or against a support where the packing sections are arranged.

According to one feature of certain embodiments of the invention, the pivoting movement of the hooks takes place at a face of the peripheral member that is opposed to the retaining means. Such a configuration makes it possible for the hooks not to butt against the retaining means during their pivoting movement.

According to one feature of certain embodiments of the invention, each hook comprises a termination configured to be in direct contact with a flange of the casing. The termination thus forms an axial stop against the casing, that is to say parallel to the main axis, in order to correctly hold the insertion device against the casing. In order for the hooks to engage optimally, the casing can comprise a flange extending circumferentially around the casing and against which the termination of each hook butts when the hooks are in the deployed position.

Certain embodiments of the invention also cover an insertion system for inserting at least one packing section into a cylindrical casing, comprising a bearing structure and an insertion device as described above, the insertion device being borne by the bearing structure in such a way that the fastening means are able to fasten the insertion device to the casing.

The bearing structure may take the form of a gantry which is able to move in at least one direction while bearing the insertion device gripping a packing section. In order to carry out such a movement, the bearing structure can, for example, be arranged on rails so that the movement takes place in the most precise possible direction.

As has been mentioned, the objective of the insertion system according to certain embodiments of the invention is to insert packing sections for a gas/liquid separation column into a casing arranged horizontally and without the need to arrange a counterweight at the opposite end from the inlet of the casing. The fastening means are therefore configured to hold said insertion system against the casing in spite of the pushing forces exerted on the packing section during the operation of inserting the latter.

According to one feature of certain embodiments of the invention, the insertion device is able in its entirety to carry out a translational movement relative to the bearing structure. Independently of the bearing structure, the insertion device can move, for example, in a vertical manner. This vertical movement is useful, for example, for positioning the insertion device plumb with a stack of packing sections and then for lowering it for the purpose of gripping the packing section arranged at the top of the stack. The vertical movement of the insertion device with respect to the bearing structure is also useful for the purpose of adjusting the position of the gripped packing section in order to correctly position the latter at the inlet of the casing and thus to promote pushing of the packing section into the casing. The relative movement of the insertion device with respect to the bearing structure can, for example, take place using a motor installed on the bearing structure and configured to move a bearing element of the insertion device along the bearing structure.

According to one feature of certain embodiments of the invention, the insertion device is able in its entirety to carry out a rotation relative to the bearing structure. The rotation makes it possible in particular to tilt the insertion device, with a bearing structure which remains fixed, between a position in which the insertion device is arranged in a vertical manner for the purpose of gripping a packing section on a vertical stack of packing sections, and a position in which the insertion device is arranged in a horizontal manner for the purpose of inserting the gripped packing section into the casing. The rotation elements must therefore be configured to allow a rotation of the insertion device by approximately 90° so that the insertion device can tilt between the aforementioned vertical and horizontal positions. The relative rotation of the insertion device with respect to the bearing structure can, for example, occur by means of a motor able to control a gear system driving the rotation of the insertion device, or else via a chain system or a hydraulic system.

Certain embodiments of the invention also cover a method for inserting at least one packing section for a gas/liquid separation column into a cylindrical casing that is implemented by an insertion system as described above, comprising:
- a step of gripping a packing section by the retaining means of the insertion device,
- a step of rotating the insertion device in its entirety with respect to the bearing structure,
- a step of moving the insertion system up to the casing by means of the bearing structure,
- a step of positioning the packing section at an inlet of the casing,
- a step of fastening the insertion device to the casing using the fastening means,
- a step of pushing the packing section into the casing.

The steps of the method are carried out using the various aforementioned elements of the insertion system. Thus, the gripping step is carried out with the aid of the retaining means of the insertion device and with the aid of the means for translating the insertion device with respect to the bearing structure, the rotation step is carried out with the aid of the rotation elements installed on the bearing structure, the movement step is carried out via the bearing structure, the positioning step is carried out with the aid of the means for translating the insertion device with respect to the bearing structure, the fastening step is carried out by virtue of the fastening means, and the pushing step is carried out with the aid of the telescopic devices. It should be noted that this is a non-exhaustive list of steps for the correct progress of the method for inserting packing sections into the casing according to the invention. By way of non-limiting example, the method according to the invention may include a step of monitoring the correct positioning of the packing section once inserted into the casing. This additional step, coming here after the pushing step, then consists in verifying and recording the correct position of the packing section which has just been inserted, using a measuring apparatus which is accurate to the millimetre.

BRIEF DESCRIPTION OF THE DRAWINGS

Other features and advantages of the invention will become further apparent via, on the one hand, the following description and, on the other hand, several exemplary embodiments given by way of non-limiting indication and with reference to the attached schematic drawings, in which:

FIG. 1 shows a side view of an insertion device according to the invention and of a stack of packing sections for a gas/liquid separation column that are able to be seized by the insertion device, FIG. 2 is a general view of a system for inserting a packing section for a gas/liquid separation column into the casing according to the invention, FIG. 3 is a detailed view of a fastening means of the insertion device, FIG. 4 is a detailed view of the fastening means attached to the casing, FIG. 5 shows a step of gripping the packing section for a gas/liquid separation column of a method for inserting packing sections, FIG. 6 shows a step of rotating the insertion device and of moving the insertion system of the method for inserting packing sections for a gas/liquid separation column, FIG. 7 shows a step of inserting the packing section of the method for inserting packing sections for a gas/liquid separation column.

DETAILED DESCRIPTION OF THE INVENTION

FIG. 1 shows an insertion device 5 comprising fastening means according to one aspect of the invention and here gripping a packing section 2 for a gas/liquid separation column at the top of a stack 24 of packing sections 2. The insertion device 5 forms part of a system for the horizontal insertion of packing sections 2 into a casing for the purpose of forming a gas/liquid separation column. Such an insertion system will be described in detail below. The insertion device 5 participates in implementing a method for inserting said packing sections for a gas/liquid separation column into the casing.

The insertion device 5 comprises a base 8 provided with retaining means 6 allowing the insertion device 5 to grip a packing section 2, regardless of the diameter of said packing section 2. In FIG. 1, there are six retaining means 6.

The base 8 comprises a main member 9 and a plurality of peripheral members 10 parallel to the main member 9. The main member 9 extends mainly along a main axis 11 passing through the centre or substantially through the centre of the gripped packing section 2. The peripheral members 10 are arranged circumferentially and uniformly around the main member 9. The aforementioned gripping means 6 are arranged at the peripheral members 10. The base 8 comprises at least two peripheral members 10. Advantageously, the base 8 comprises at least six peripheral members 10. Such a base 8 makes it possible to grip a packing section 2 of a defined diameter.

Alternatively, the base 8 can be able to deploy to cover a plurality of diameters of packing sections 2. For this purpose, each peripheral member 10 can be mechanically connected to the main member 9 by two branches 12 forming a pair of branches 13. Each of the two branches 12 comprises a first end 14 connected to the main member 9 and a second end 15 connected to the peripheral member 10. Moreover, the two branches 12 of the pair of branches 13 intersect with one another and are connected to one another at their point of intersection, that is to say substantially in their centre, by a pivot connection 16.

The main member 9 comprises two fixed rings 17, each of the fixed rings 17 being arranged at each terminal portion of said main member 9. The main member 9 comprises a telescopic body 18 able to modify a main dimension of the main member 9. Thus, by modifying the length of the main member 9, it is possible to increase or reduce the distance between the two fixed rings 17. The length of the main member 9 can be adjusted manually or via a control member which has not been shown. The telescopic body 18 makes it possible to modify the length of the main member 9 by deploying or retracting at least one of the terminal portions thereof.

The first end 14 of each branch 12 of the pair of branches 13 connecting the main member 9 to one of the peripheral members 10 is more particularly connected to one of the fixed rings 17 arranged on the main member 9. Each pair of branches 13 thus comprises a first branch 12a of which the first end 14 is connected to a first fixed ring 17a, and a second branch 12b of which the first end 14 is connected to a second fixed ring 17b. The second end 15 of the two branches 12 is for its part fastened to the peripheral member 10 and at least one of them can slide along the latter, for example by means of a slideway 19 formed at one of the faces of the peripheral member 10.

Thus, when the length of the main member 9 is modified by means of the telescopic body 18, the distance between the fixed rings 17 and, therefore, the distance between the first ends 14 of each of the two branches 12 are also modified. With the branches 12 being connected at a point forming a pivot connection 16, this point tends to move towards or away from the main member 9 depending on the first ends 14 moving away from one another or moving towards one another. The movement of the telescopic body 18 thereby causes a modification of the inclination of the branches 12 of each of the pair of branches 13 and thus modifies a radial distance between the main member 9 and the peripheral members 10.

The retaining means 6 can thus be spaced apart in order to be able to engage around packing sections 2 of various diameters. The greater the length of the main member 9, the more the fixed rings 17 are moved away from one another, and the closer are the peripheral members 10 to the main member 9, adapting the insertion device 5 to a small diameter of a packing section 2. Conversely, the lower the length of the main member 9, the more the fixed rings 17 are moved towards one another, and the further away are the peripheral members 10 from the main member 9, adapting the insertion device 5 to a large diameter of a packing section 2. The base 8 as has just been mentioned therefore makes it possible to adapt the insertion device 5 to a plurality of diameters of packing sections 2 and of casings.

Once the desired radial distance has been established, this can be fixed by a locking means 20. The locking means 20 can, for example, be associated with a plurality of deployable bars 21 extending between two adjacent peripheral members 10, as is illustrated in FIG. 1.

With a base 8 able to be deployed as described above, the retaining means 6 can be adjusted to correctly seize the packing section 2, regardless of the diameter thereof.

Owing to the packing section 2 being engaged by the edge, associated with the fact that the packing sections 2 have a cylindrical shape with a circular or substantially circular cross section, the retaining means 6 have a circular arc shape in order that the whole of the retaining means 6 intended to be in contact with the packing section 2 hugs a radius of curvature thereof. The gripping of the packing section 2 is thus facilitated and more stable. In order that the gripping of the packing section 2 by the retaining means 6 is optimal, the curvature of the circular arc formed by the retaining means 6 is adjustable in order to adapt to all diameters of packing sections 2.

After gripping of the packing section 2 by the retaining means 6, the latter can be controlled in an individual manner with respect to one another for the purpose of pushing onto a precise point of the packing section 2 and to locally deform the latter. Such a local deformation may be recommended when there is a shape differential between the packing section 2 and the casing into which the packing section 2 is intended to be inserted. The local deformation thus makes it possible to slightly modify the shape of the packing section 2 so that it can then be inserted more easily into the casing.

At least two of the peripheral members 10 are provided with telescopic devices 22. The telescopic devices 22 can be arranged on a peripheral member 10 also provided with a retaining means 6, the essential thing being that all of these elements do not mechanically interfere with one another. The telescopic devices 22 make it possible to push on the packing section 2 once the latter has been placed facing the casing. This pushing is performed as soon as the retaining means 6 have been commanded to release the packing section 2. The telescopic devices 22 deploy in order to push the packing section 2 up to the end of the casing, regardless of the length thereof. If one or more packing sections 2 have already been previously inserted into the casing, the telescopic devices push the packing section 2 until the latter is in contact with the previously inserted packing section 2. The telescopic devices 22 can be integrated into the above-described base 8. In FIG. 1, with the insertion device 5 being in the process of gripping a packing section 2 on the stack 24, the telescopic devices 22 are therefore collapsed.

The insertion device 5 also comprises a plurality of fastening means 39. The latter each comprise a hook 28 intended to fasten and hold the insertion device 5 against the casing during the insertion of the packing sections 2 into the casing.

In FIG. 1, the insertion device 5 is in the course of gripping a packing section 2. The fastening means 39 are therefore not used at this stage of the insertion method. Consequently, the hooks 28 have a retracted position in order not to mechanically interfere with the gripping of the packing sections 2 by the retaining means 6. The hooks 28 are therefore set back from the retaining means 6 with respect to the main axis 11, that is to say with the retaining means which are positioned at a distance from the free end of the peripheral members 10. This retracted position also makes it possible for the hooks 28 not to butt against the ground when the insertion device 5 comes to grip the last packing section 2 of the stack 24 of packing sections 2.

FIG. 2 shows the system 1 for the horizontal insertion of packing sections 2 as mentioned above, in the course of inserting a packing section 2 into the casing 3 for the purpose of forming a gas/liquid separation column. Such separation columns take, for example, a cylindrical shape of circular or substantially circular cross section. The separation columns may have a main dimension of several tens of metres and a cylindrical cross section of several metres. The packing sections 2 caused to be inserted into these separation columns can have a circular or substantially circular cross section of a diameter of the order of 2.5 m to 5 m.

For reasons of mechanical bulk in terms of height making the insertion operation impossible when the casing 3 is arranged vertically, said operation is here carried out with the casing 3 in the horizontal position, the insertion of the packing sections 2 also being carried out in a horizontal direction.

The system 1 for inserting packing sections 2 according to the invention makes it possible to perform the method for inserting said packing sections 2 into the casing 3, although the latter is in the horizontal position and consequently can lead to mechanical stresses.

After gripping of a packing section 2 by the insertion device 5, as illustrated in FIG. 1, the insertion system 1 subsequently makes it possible to perform a rotation in order to arrange the packing section 2 to face an inlet of the casing 3, to move up to the inlet of the casing 3 and then to push the packing section 2 up to the bottom of the casing 3 or against another packing section 2 already inserted into the casing 3, thereby ensuring the most fluid possible advancement, that is to say with the fewest possible jolts, of the packing section 2 within the casing 3.

For this purpose, the insertion system 1 comprises a bearing structure 4 taking the form of a gantry comprising two pillars 7 between which the insertion device 5 rests. The bearing structure 4 can, for example, be mounted on rails in order that the insertion system 1 can perform a linear movement between the stack of packing sections 2 and the casing 3.

The insertion system 1 further comprises a first motor 25 allowing the insertion device 5 in its entirety to carry out a translational movement with respect to the bearing structure

4. The insertion system 1 also comprises a second motor 26 for actuating a gear system 27 for moving the insertion device 5 in its entirety so as to carry out a rotation relative to the bearing structure 4. This rotation makes it possible to switch the insertion device 5 from a vertical position to a horizontal position so as to be able to arrange the packing section 2 to face the inlet of the casing 3, as mentioned above.

In FIG. 2, the telescopic devices 22 are deployed. The insertion device 5 comprises six peripheral members 10 of which three are provided with telescopic devices 22. The telescopic devices 22 are distributed uniformly around the main axis 11.

The insertion system 1 is structured in such a way that the telescopic devices 22 can be deployed in the horizontal direction in order to perform the step of insertion into the casing 3 arranged horizontally. In other words, the telescopic devices 22 are able to be deployed parallel to the main axis 11 and to an axis of the elongation of the peripheral members 10.

When the insertion device 5 is arranged in the vicinity of the casing 3 for the purpose of subsequently inserting a packing section 2 therein, the fastening means 39 are employed in order for the hooks 28, then in the retracted position as illustrated in FIG. 1, to be deployed. In their deployed position, the hooks 28 make it possible to fasten the insertion system 1 to the casing 3, for example by engaging on a flange 29 extending circumferentially around the casing 3 at the end of the casing 3 through which the packing sections 2 are inserted. More precisely, one end of each hook 28 forms a termination which is intended to come into contact, in the deployed position of this hook, with a face of the collar 29 that is oriented away from the insertion device 5. Once in the deployed position, the hook 28 in contact with the flange 29 forms an axial stop to the relative movement of the casing with respect to the insertion device. The hooks 28 thus mechanically hold the casing 3 facing the insertion device 5, including during the insertion of the packing section 2 into the casing 3. The presence of these hooks 28 makes it possible to realize a counterweight sufficient to retain the casing 3 in spite of the forces exerted thereon during the insertion of the packing sections 2. The fact that the insertion device 5 is equipped with such hooks 28 makes it possible to avoid providing the presence of a bulky and heavy counterweight arranged at the rear of the casing 3 in order to block the latter under the pushing force for inserting the packing section 2.

In order that the insertion of the packing section 2 into the casing is performed in a uniform manner, with the minimum of jolts, the insertion device 5 comprises a pushing means 23 fastened to the end of each telescopic device 22, this pushing means 23 being intended to be in direct contact with the packing section 2 during the insertion. The pushing means 23 mechanically distributes the forces exerted by each of the telescopic devices 22 by bearing on the whole periphery of the packing section 2 so as to avoid the localization of the forces only at the end of the telescopic devices 22. The pushing means 23 thus makes it possible to avoid damaging the inserted packing section 2 on account of a localized pushing force. When the telescopic devices 22 are collapsed, the pushing means 23 is arranged in the vicinity of the peripheral members 10.

In the case where the base 8 is configured to deploy radially and to adapt to various diameters of a packing section 2, a plurality of pushing means 23 of different dimensions are designed and the installation of the appropriate pushing means 23 is carried out after the radial distance between the main member and the peripheral members 10 has been determined.

When the telescopic devices 22 deploy to push the packing section 2 into a casing 3 having a great length, for example several tens of metres, the telescopic devices 22 deploy until reaching a considerable length which can harm their stability. The insertion device 5 can therefore comprise a holding member 32 connected to all of the telescopic devices 22 and arranged so as to be substantially at an equal distance between the pushing means 23 and the inlet of the casing 3. The holding member 32 has the function of maintaining the position of each of the telescopic devices 22 and also the distance between each of them. The holding member 32 therefore participates in the distribution of the forces exerted on the inserted packing section 2. The holding member 32 also ensures the stability of the telescopic devices 22 by avoiding potential bending thereof that may arise in the case of extension to a great length of said telescopic devices 22. As is illustrated in FIG. 2, the holding member 32 has a triangular shape in order to maintain three telescopic devices 22 evenly distributed around the main axis 11. However, the shape of the holding member 32 can vary according to the number of telescopic devices 22 included in the insertion device 5. In a variant which has not been shown, the holding member 32 can comprise a set of casters, each arranged as an extension of the branches of the holding member, beyond the telescopic devices, which are respectively in contact with the inner face of the peripheral wall of the casing. It is then aimed to ensure continuous guiding of the holding member within the casing during the deployment of the telescopic devices and the insertion of a packing section. This continuous guiding, by contact of at least one of the casters against the casing, makes it possible to facilitate the insertion in spite of the weight of the assembly formed by the telescopic arms and the pushing means 23 that could cause the assembly to become misaligned. Alternatively or additionally, the pushing means can also comprise one or more casters arranged at the periphery in order to be in contact with the inner face of the tubular wall of the casing during the insertion of the packing sections into the casing.

FIG. 3 shows in detail the fastening means 39 and makes it possible to illustrate the functioning of said fastening means 39. The latter, in addition to comprising the above-described hook 28, also comprises a retractable cylinder 30 and a drive assembly 40 mechanically connecting the retractable cylinder 30 to the hook 28.

The retractable cylinder 30 can, for example, be a hydraulic or pneumatic cylinder whose translational movement drives that of the hook 28, via the drive assembly 40. For this purpose, the retractable cylinder 30 comprises a rod 45 constituting a movable part of the retractable cylinder 30 and able to push or pull the drive assembly 40.

The drive assembly 40 comprises a connecting rod 41 and a crank 46. The connecting rod 41 is driven by the rod 45 of the retractable cylinder 30, and in turn drives the crank 46. The latter then drives the hook 28. The connecting rod 41 and the crank 46 make it possible to convert a linear movement 43 implemented by the retractable cylinder 30 into a pivoting movement 44 of the hook 28.

Thus, when the retractable cylinder 30 retracts, the drive assembly 40, and therefore the connecting rod 41 and the crank 46, is also driven and drives the pivoting movement 44 of the hook in order for the latter to deploy and tilt from the retracted position to the deployed position, the latter being visible in FIG. 4, which will be described below. This movement makes it possible to fasten the insertion device to the casing before the insertion of the packing section into the casing and after the insertion device is correctly positioned facing the inlet of the casing.

Conversely, when the retractable cylinder 30 deploys, the latter causes the drive assembly 40 to be pushed, and the connecting rod 41 and the crank 46 drive the pivoting movement 44 of the hook in order for the latter to retract and tilt from the deployed position to the retracted position. This movement is implemented once the packing section has been inserted into the casing and before the insertion system moves to go to grip a new packing section.

As is visible in FIG. 3, the pivoting movement 44 of the hook 28 occurs in an opposed manner to the retaining means 6 with respect to the main axis 11. This pivoting movement 44 thus makes it possible not to butt against the retaining means 6 when the hook 28 deploys or retracts. Each retaining means 6 is arranged on one of the peripheral members 10 so as to extend in the direction of the main axis 11 in order to engage with the edge of the packing section. Each hook 28 is therefore fastened to one of the peripheral members 10 so as to assume a retracted position facing a face of said peripheral member 10 that is oriented away from the main axis 11.

As has been mentioned, the hook 28 comprises a termination 42. The latter has a tip projecting from the body of the hook 28 and intended to come into direct contact with the flange of the casing when the hook 28 is in the deployed position. In this deployed position, the contact between the hook and the flange thus forms a point-specific axial stop of the insertion device on the casing, such that the casing is blocked axially, in the same direction as the direction of insertion of the sections into the casing. The hooks must make it possible to maintain the insertion system in position relative to the casing in spite of the large pushing force generated by the telescopic devices during the insertion of the packing sections.

FIG. 4 also shows the fastening means 39, but with this time the hook 28 positioned so as to fasten the insertion system to the flange 29 of the casing 3. As has been described above, to assume this deployed position, the telescopic cylinder 30 retracts with the linear movement 43, and the drive assembly 40 is also set in movement so that the connecting rod 41 drives the hook 28 in its pivoting movement 44 in order that said hook 28 closes onto the casing 3 and that the termination 42 comes into contact with the flange 29. More particularly, the termination 42 comes into contact with a face of the flange 29 that is opposed to the insertion device, with the result that the termination 42 prevents the flange and therefore the casing from moving away from the insertion device under the pushing force generated for the insertion of a packing section. Alternatively to what has been described in FIG. 3, each hook 28 can comprise two terminations 42 interconnected by a spacer 47 in order to increase the number of contact points between the hooks 28 and the flange 29. The insertion system is then ready to insert the packing section 2 borne by the retaining means 6 into the casing 3.

FIGS. 5 to 7 schematically illustrate an example of the progression of the method for inserting a packing section 2 according to the invention.

As has been described above, it is the insertion system 1 in its entirety, that is to say the insertion device 5 and the bearing structure 4, which makes it possible to implement the insertion method. Thus, FIG. 5 shows in particular a step of gripping a packing section 2 on the vertical stack 24 of packing sections 2. For this purpose, the insertion system 1 can move in its entirety up to the stack 24 of packing sections, for example by means of rails 34 as mentioned above.

The insertion device 5 is able in its entirety to carry out a translational movement 35 with respect to the bearing structure 4, for example a translational movement along the pillars 7 in a vertical manner, that is to say in a manner parallel to said pillars 7. This translational movement 35 may be brought about, for example, by the first motor 25 actuated remotely. This translational movement 35 is, for example, used in order that the insertion device 5 reaches the top of the vertical stack 24 of packing sections 2 and overhangs the latter, as is illustrated in FIG. 5. With this being done, and once the bearing structure 4 has been arranged around the vertical stack 24 of packing sections 2, the translational movement 35 makes it possible to move the insertion device 5 towards the stack 24 of packing sections 2 in order to grip the packing section 2 at the top of said stack 24 via the retaining means 6. Once a packing section 2 has been gripped, the insertion device 5 is again moved in a vertical manner in order to raise the gripped packing section 2.

FIG. 6 illustrates a step of rotating the insertion device 5 and a step of moving the insertion system 1 up to the casing 3. These two steps occur after a packing section 2 has been gripped by the retaining means 6. In order to ensure the step of rotating the insertion device 5 with respect to the bearing structure 4, the insertion device 5 comprises rotation-inducing means, here via the gear system illustrated in FIG. 2, ensuring at least one rotation 36 of 90° or substantially 90° of the insertion device 5 with respect to the bearing structure 4. The second motor 26 can be borne by the bearing structure 4 and controlled in such a way that the motor output shaft actuates the gear system and therefore the rotation 36 of the insertion device 5 with respect to the bearing structure 4. This rotation device driven by the second motor 26 thus makes it possible for the insertion device 5 to tilt between a first vertical position, making it possible to grip the packing sections 2 on the stack 24 of packing sections 2, as is illustrated in FIG. 5, and a second horizontal position in order to arrange the gripped packing section 2 to face the horizontal casing 3, as is illustrated in FIG. 6.

Subsequently, the bearing structure 4 can move while bearing the insertion device 5 for the purpose of moving the gripped packing section 2 towards the casing 3 in order to insert it therein, for example by means of the rails 34 as mentioned above. In order to stabilize the casing 3, the latter may be arranged on supports 37.

FIG. 7 illustrates the step of positioning the insertion device 5 at the inlet of the casing 3 and also the step of pushing the packing section 2 into the casing 3. In order to correctly position the packing section 2 at the inlet of the casing 3, the vertical position of the insertion device 5 may possibly be adjusted by virtue of the vertical translational movement along the pillars 7 of the bearing structure 4 in order that the gripped packing section 2 perfectly faces the inlet of the casing 3. With this being done, the fastening device 39 is employed as illustrated in FIGS. 3 and 4 in order that the hooks 28 close onto the flange 29 of the casing 3 and can thus maintain the insertion system 1 and more particularly the insertion device 5 facing the inlet of the casing 3.

The pushing step starts after the retaining means 6 release the packing section 2. After the release of the packing section 2 by the retaining means 6 and before the telescopic devices 22 are deployed for inserting the packing section 2, the latter can, for example, rest on a holding support 38 in order that the packing section 2 remains positioned correctly facing the inlet of the casing. The telescopic devices 22 then deploy so that the pushing means 23 inserts the packing section 2 into the casing 3, as has been described above. Once the insertion of the packing section 2 has been carried out, the telescopic devices 22 can retract, and the insertion system 1 can move again to recover the following packing section 2. The insertion method then recommences from the gripping step described in FIG. 5.

Of course, the invention is not limited to the examples which have just been described and numerous modifications may be made to these examples without departing from the scope of the invention.

The invention, as has just been described, does indeed achieve its stated objective, and makes it possible to propose a device for inserting a packing section into a horizontal casing, comprising fastening means for holding said insertion device against said casing. Variants that have not been described here could be implemented without departing from the context of the invention, provided that, in accordance with the invention, they comprise an insertion device according to the invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

The invention claimed is:

1. An insertion device for inserting at least one packing section for a gas/liquid separation column into a cylindrical casing, the insertion device comprising:

a base provided with retaining means which are configured to grip a packing section and which are arranged uniformly around a main axis;

at least two fastening means secured to the base, said fastening means being configured to fasten the insertion device to the casing.

2. The insertion device according to claim 1, wherein the fastening means are arranged uniformly around the main axis.

3. The insertion device according to claim 1, wherein at least one fastening means and one retaining means are arranged on one and the same peripheral member of the base.

4. The insertion device according to claim 1, wherein the fastening means each comprise a retractable cylinder, a hook and a drive assembly mechanically connecting the retractable cylinder to the hook.

5. The insertion device according to claim 1, wherein the drive assembly comprises at least one connecting rod and a crank which are configured to drive a pivoting movement of the hook according to a linear movement of the retractable cylinder.

6. The insertion device according to claim 5, wherein the hooks are able to pivot between a retracted position and a deployed position.

7. The insertion device according to claim 1, wherein the hooks in the retracted position are set back from the retaining means with respect to the main axis.

8. The insertion device according to claim 7, wherein at least one fastening means and one retaining means are arranged on one and the same peripheral member of the base, wherein the pivoting movement of the hooks takes place at a face of the peripheral member that is opposed to the retaining means.

9. An insertion system for inserting at least one packing section for a gas/liquid separation column into a cylindrical casing, the insertion system comprising:

a bearing structure; and an insertion device according to claim 1, the insertion device being borne by the bearing structure in such a way that the fastening means are configured to fasten the insertion device to the casing.

10. The insertion system according to claim 9, wherein the insertion device is configured in its entirety to carry out a translational movement relative to the bearing structure.

11. The insertion system according to claim 9, wherein the insertion device is configured in its entirety to carry out a rotation relative to the bearing structure.

12. A method for inserting at least one packing section for a gas/liquid separation column into a cylindrical casing that is implemented by an insertion system according to the preceding claim, the method comprising:

gripping a packing section by the retaining means of the insertion device;

rotating the insertion device in its entirety with respect to the bearing structure;

moving the insertion system up to the casing by means of the bearing structure;

positioning the packing section at an inlet of the casing;

fastening the insertion device to the casing using the fastening means; and pushing the packing section into the casing.

* * * * *